United States Patent
Memmel

[11] 3,819,241
[45] June 25, 1974

[54] SLIDE BEARINGS AND JOURNALS

[75] Inventor: Manfred Memmel, Schweinfurt, Germany

[73] Assignee: SKF Industrial Trading and Development Company, Amsterdam, Netherlands

[22] Filed: Oct. 4, 1972

[21] Appl. No.: 294,893

[30] Foreign Application Priority Data
Oct. 19, 1971  Germany............................ 7139476

[52] U.S. Cl................................. 308/3 R, 308/238
[51] Int. Cl. ................................................ F16c 33/12
[58] Field of Search.............. 308/3 R, 3.5, 26, 238; 14/16

[56] References Cited
UNITED STATES PATENTS

| | | |
|---|---|---|
| 2,238,197 | 4/1941 | Watson .................................. 308/26 |
| 3,031,202 | 4/1962 | Melton et al. ......................... 308/238 |
| 3,130,991 | 4/1964 | Piragino .............................. 308/238 |
| 3,193,910 | 7/1965 | Evans................................... 308/238 |
| 3,275,338 | 9/1966 | Herbenar et al...................... 308/26 |
| 3,461,529 | 8/1969 | Van Dorn ............................ 308/72 |
| 3,602,560 | 8/1971 | Memmel ............................. 308/238 |

Primary Examiner—Charles J. Myhre
Assistant Examiner—Barry Grossman
Attorney, Agent, or Firm—Murray Schaffer

[57] ABSTRACT

A slide bearing or journal having a pair of opposed support means. Glide elements are located between the support members, the glide elements being held by rigid thrust means also forming a sliding surface with the support members. The glide elements are elastic and project from the edge of the thrust members when the bearing is unloaded an amount equal to the elastic compression stroke of the material when the bearing is loaded.

12 Claims, 6 Drawing Figures

SLIDE BEARINGS AND JOURNALS

BACKGROUND OF THE INVENTION

The present invention relates to bearings and journals and in particular to such devices as universal joints, ball socket joints, shaft journals and the like employing glide elements allowing opposed surface members to slide with respect to each other.

It is known to form rotary slide bearings with plastic glide elements inserted between the bearing rings and to arrange the rings to lie only on the sliding surface of the glide elements. It is further known to provide a slide bearing for planar or flat movement in which a row of glide elements formed of synthetic material, are arranged on a base plate and seal means provided between the lateral frame of the glide elements and the glide elements themselves. It is also known to provide rocker bearings for bridges and similar large structures in which the load carrying cushion is formed from rubbery elastic material which is enclosed by a seal member or gasket extending about the area of the cushion.

These known constructions have the disadvantage that they have only limited use under extremely high operating temperatures and under high load conditions. The glide member melts under such conditions and tends to creep and spread out destroying its gliding and slide ability.

It is therefore the object of the present invention to provide a bearing or journal of the type described which overcomes the disadvantages of the prior art.

It is a further object of the present invention to provide a slide bearing or slide journal, such as a ball and socket, universal joint or the like in which synthetic glide elements are used and in which the glide elements are set in place between the support members.

It is a further object of the present invention to provide a slide bearing of the types described which are simpler in construction than those presently known and are more efficient and have a larger operating life under extreme operating conditions.

These objects as well as others together with numerous advantages will be seen from the following disclosure of the invention.

SUMMARY OF THE INVENTION

According to the present invention a slide bearing of any one of the types disclosed may be provided comprising a pair of opposed support members, such as race rings, journal blocks, etc., At least one elastic glide elements is arranged between the supports to permit the supports to slide over the elements with respect to each other. A rigid thrust member holds each of the glide elements and is formed with a facial edge or surface adapted itself to slide on the surface of at least one of the supports. The glide elements is formed to project from the facial edge or surface when the bearing is in unloaded or non-stressed condition by an amount equal to the elastic compressability of the material of the glide element when the bearing is under load conditions. In this manner under load conditions part of the load is absorbed and carried by the glide element and part by the thrust member; the two forming a unitary interlocking mass or unit.

The glide member and/or the thrust ring surrounding it may be inserted in a hole or recess formed in the bearing support member, or in a hole or recess formed in a cage interposed between the members. The cage may be secured or fixed to one of the support members if desired.

In addition sealing means preventing passage of dirt or other impurities can be arranged on the facial edge or surface of the thrust member. This is possible because the thrust member supports only a portion of the load impressed on the bearing.

Full details of the present invention are illustrated in the following description and in the accompanying drawings in which the invention is shown as applied to a universal joint bearing.

DESCRIPTION OF THE INVENTION

The invention is illustrated as embodied in an annular joint, although it should be remembered that it may also be employed in arcuate rocker bearings, flat slidable bearing supports and in many other bearing embodiments.

Figure 1:
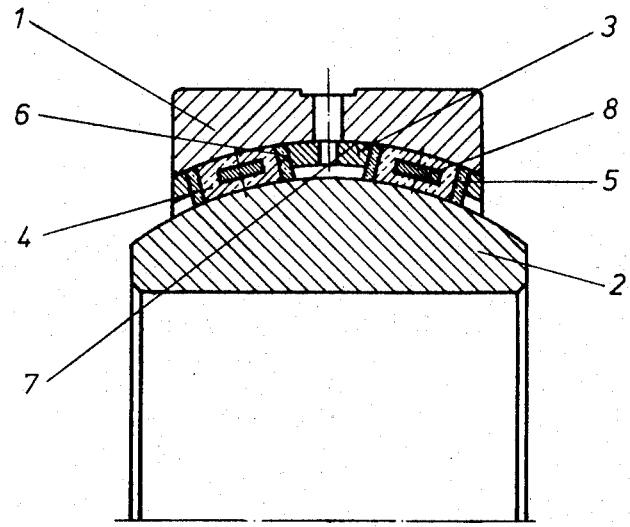
FIG. 1 is a sectional view showing the upper half of a symmetrical universal joint of the ball and socket type.

Turning to FIG. 1, the bearing comprises an outer support member or ring 1 having a spherical race or sliding surface, a conforming inner support member or ring 2, coaxial about a central axis X-X. Interposed between the rings 1 and 2 is a cage 3 which is welded or otherwise secured to the outer ring 1. Glide elements 4 formed of elastic synthetic material and provided with thrust members 5 are set within corresponding recesses formed in the cage 3. The glide elements are preferably disk like round or rectangular members and are surrounded about their narrow edge by the thrust members 5 which are formed as rings. The glide elements have a wide area in contact with the sliding surface of the support members 1 and 2. The glide elements may be annular and arranged as rings extending about the central axis, if desired. In any event sufficient contact surface is to be made symmetrical about the bearing to obtain the desired sliding effect. The slide members are made of synthetic plastic or rubber material having a degree of compressibility and resilient elasticity greater than the thrust member 5. Nylon, Teflon may be used for example, although other materials will be readily known by those skilled in this art.

Figure 2:
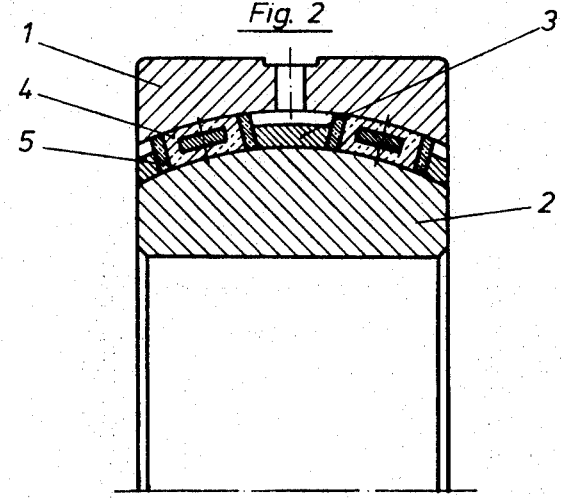
FIG. 2 is a similar view of a modified form of the joint.
Figure 3:
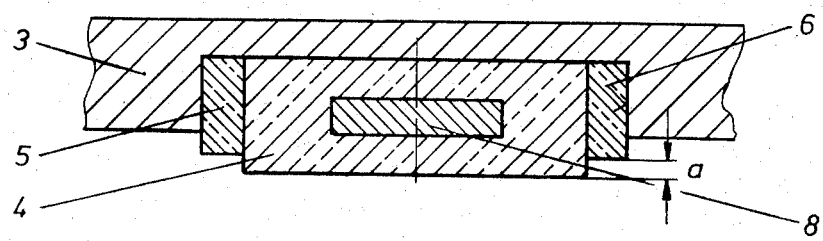
FIG. 3 is an enlarged sectional view showing a glide element in unloaded relaxed condition.

The thrust members 5 are preferably formed of a rigid bronze alloy for strength and low friction characteristics. Steel cores coated with bronze may be used. The thrust member 5 is arranged in the recesses of the cage and is provided with a frontal or facial edge or surface which is adapted to slide on the inner ring 2. The thrust member, because of its rigidity and strength defines the minimum space between the opposed race or sliding surfaces of the inner and outer support members 1 and 2. Of course, the frontal edges of the respective thrust members 5 conform to the curvature 7 of the inner and outer support members. As seen in FIG. 3, which shows the element in unloaded or relaxed condition, the glide elements 4 and the thrust members 5 are dimensioned, radially relative to each other so that the glide element 4 projects beyond the frontal edge or sliding surface of the thrust member by a distance a. The distance a is chosen so that when a load is placed on the bearing, as when the bearing is in assembled condition as seen in FIGS. 1 and 2, its elastic stroke conforms to the load placed on it and the glide element compresses to a size equal to that of the thrust member 5 causing the thrust member to touch the surface of the inner ring and absorb a portion of the load placed on the bearing. The glide element thus compresses to have its surface conform to the spherical surface of the inner and outer rings and is so completely contained within the surrounding thrust member 5. Because the glide element so conforms, and is so contained, it forms a cohesive unit with the thrust member and it will not, as a consequence, creep or flow within the bearing. In this novel arrangement, the glide element 4 and the thrust member 5 becomes such a unitary mass that the fixing of the glide element within the actual extent of the plate (i.e. the area of the area of the surrounding thrust member 5) is assured during the operation of the bearing. Thus, extraneous fastening means or adhesion means for the glide elements are not required. To provide the glide element with a degree of equalization and stability a metal or other rigid hard insert disk 8 may be embedded within the center of the glide element.

In FIG. 2 a modified version of the bearing shown in FIG. 1 is illustrated. In this figure the cage 3 is secured to the inner ring support member 2 and the glide element 4 and thrust disk 5 are made to slide against the corresponding surface of the outer member 1.

Figure 4:
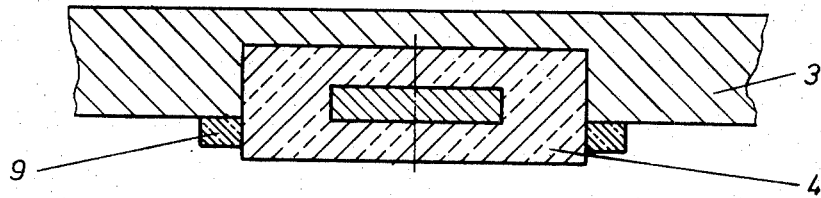
FIG. 4 is a similar view to FIG. 3 showing a thrust member lying on the cage surface.

In FIGS. 3 and 4 still another modification is shown wherein the glide element 4 is bodily set into the recess 6 in the cage 3 and the thrust member 5 lies on the frontal face of the cage surrounding only a portion of the glide element 4 projecting from the recess. The cage 3 thus absorbs some of the stress by being a backing for the thrust member 5.

Figure 5:
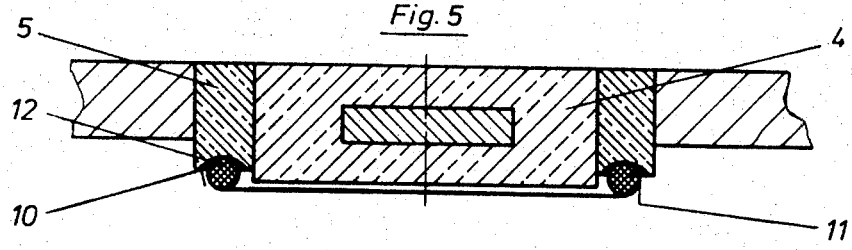
FIG. 5 is a view similar to FIG. 3 showing seal means arranged on the thrust member.

In FIG. 5 the construction of FIGS. 1 – 3 is modified still further by providing the facing edge 10 of the thrust member 5, that is the edge which would slide on the corresponding surface of the inner or outer support member, with a shallow concave groove 11 in which an annular seal member 12 is set. The seal member may be an O-ring gasket, a rubber washer or the like and is adapted to provide a suitable seal with the corresponding surface of the support member. Preferably, the seal member 12 and the groove are chosen so that the seal has a volume which when compressed under bearing conditions feels the groove 11 and allows the edge of the thrust member to slide against the surface of the support member, while still maintaining the proper seal.

Figure 6:
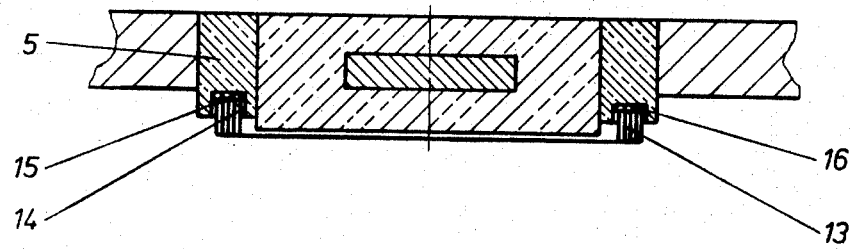
FIG. 6 is a view similar to FIG. 3 showing seal means formed of a plurality of flat bands.

In FIG. 6 a modification of FIG. 5 is shown. Here a plurality of thin wall like bands 13 for the seal. The bands 13 are sandwiched within a rectangular groove 14 formed, instead of the concave groove 12, in the edge of the thrust member. Seated in bottom 15 of the groove 14 is an elastic layer 16 in which the bands 13 sit on edge. The elastic layer permits the bands 13 to deform easily under compressive load.

The greatest advantage of the bearing as described, lies in the fact that it may be used under high temperature conditions. Because synthetic material such as plastic is used, the glide element becomes softer during use and the inner and outer support members seem to swim over a liquid pressure cushion. Since a large portion of the load is absorbed by the glide members, the relative slidability of the supporting members is increased.

Preferably, the bearing is formed of a plurality of disk like glide members surrounded by circular or annular thrust members in the form of rings. Its seal members are correspondingly formed. It will also be obvious that the cage 3 may be eliminated and the recess 6 formed directly in the face of the corresponding support members 1 or 2.

While a universal joint or radial bearing has been illustrated herein, it will be obvious that the concept of the present invention can be used in flat planar slide bearings or supports wherein the support members are caused to move axially. The slide elements may be circular, or rectangular. They may be made annular to go around the entire surface of the bearing rings or they may be made in several sections. Further, the slide elements may be set in recesses or holes formed in the bearing rings themselves avoiding the use of cages or other holding devices. Since various modifications and changes can be made, the present disclosure should be taken as illustrative only and not limiting of the scope of the invention.

What is claimed is:

1. A bearing comprising a pair of opposed support members, at least one elastic glide element arranged between said supports to permit said supports to slide with respect to each other, a rigid thrust member holding each of said glide elements, said thrust member having a facial edge adapted to slide on at least one of said supports, said glide elements projecting from its associated thrust member when said bearing is in unloaded condition an amount equal to the elastic compressibility of said slide element when said bearing is under load condition.

2. The bearing according to claim 1 wherein said glide elements are formed of synthetic compressible material.

3. The bearing according to claim 1 wherein each of said thrust members is set within a corresponding recess formed in one of said bearing support members and surrounds its associated glide element.

4. The bearing according to claim 1 including a bearing cage interposed between said bearing support members, said cage having a recess in which a respective thrust member is set, said thrust member surrounding its associated glide element.

5. The bearing according to claim 1 wherein each of said glide elements is set within a corresponding recess formed in one of said bearing support members and its associated thrust member lies on said support member surrounding said glide element.

6. The bearing according to claim 1 including a cage interposed between said bearing support members, said cage having a corresponding recess in which said glide element is set and said thrust member lies on said cage surrounding its associated glide element.

7. The bearing according to claim 1 including sealing means arranged on the facial edge of said thrust member to seal said thrust member and the associated bearing support.

8. The bearing according to claim 7 wherein the edge of said thrust member is provided with a groove for receiving said seal means.

9. The bearing according to claim 8 wherein the cross section of said groove corresponds to the volume of said seal means.

10. The bearing according to claim 8 wherein said seal means comprises a plurality of flat rings concentrically arranged.

11. The bearing according to claim 10 including an elastic annular disk inserted between said groove and said plurality of flat rings.

12. The bearing according to claim 1 including a rigid reinforcing member embedded within said gliding element.

* * * * *